UNITED STATES PATENT OFFICE.

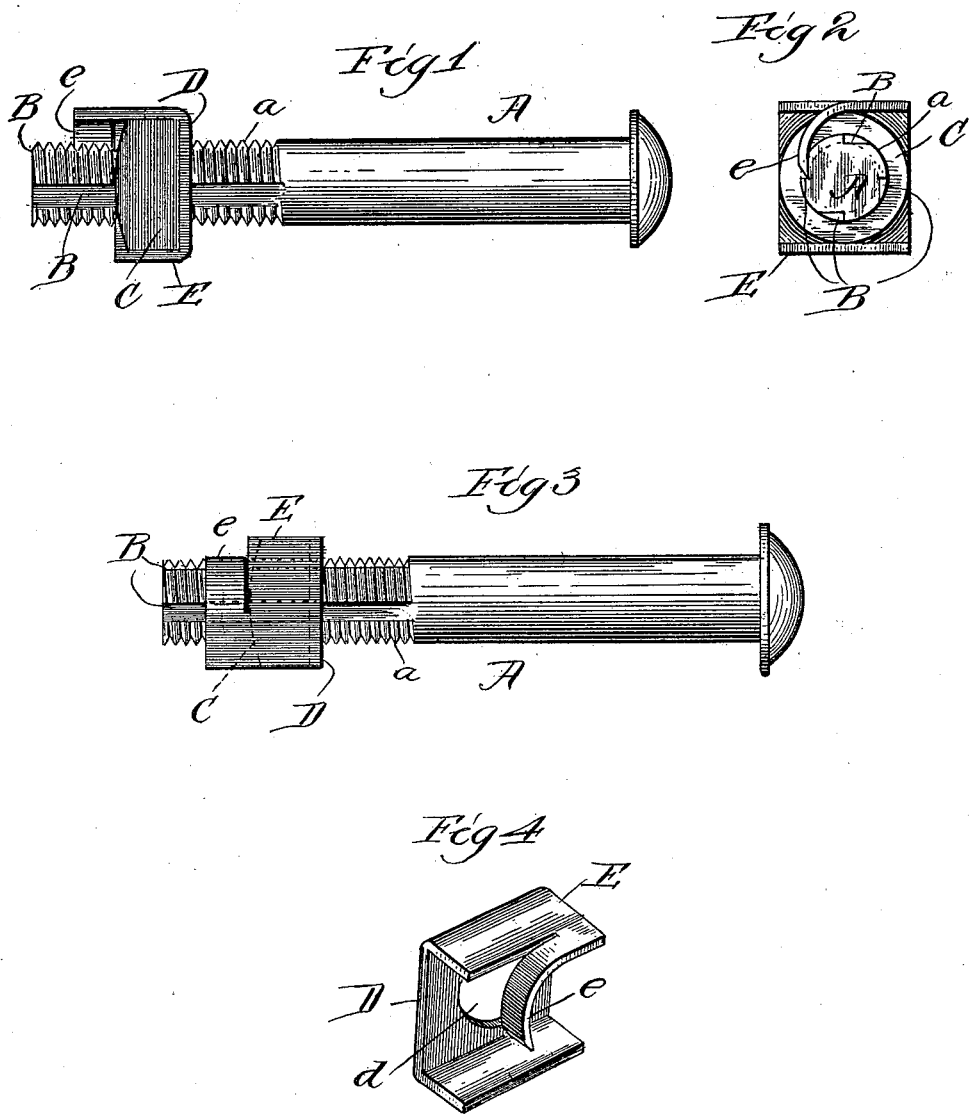

LEWIS J. BEHRER, OF CHICAGO, ILLINOIS, ASSIGNOR OF THREE-FOURTHS TO HUGH H. JONES, RALPH F. BOGUE, AND WILLIAM E. BOGUE, OF SAME PLACE.

NUT-LOCK.

SPECIFICATION forming part of Letters Patent No. 632,334, dated September 5, 1899.

Application filed December 17, 1898. Serial No. 699,550. (No model.)

*To all whom it may concern:*

Be it known that I, LEWIS J. BEHRER, a citizen of the United States of America, and a resident of Chicago, county of Cook, and State of Illinois, have invented certain new and useful Improvements in Nut-Locks, of which the following is a specification, and which are illustrated in the accompanying drawings, forming a part thereof, and in which—

Figure 1 is an elevation of the device applied to a nut and bolt. Fig. 2 is an end view of the same. Fig. 3 is the same, but from a point of view ninety degrees removed from that of Fig. 1; and Fig. 4 is a perspective of the locking device.

The objects of the invention are to provide a simple, inexpensive, yet secure means for locking together a screw-bolt and the nut applied thereto. These objects are accomplished by means of a washer having two oppositely-disposed upturned flanges, at least one of which projects beyond the other face of the nut and carries a spring tongue or pawl adapted to engage a longitudinal groove in the bolt. A ratchet-and-pawl action is thus secured, the washer turning with the nut as the latter is screwed up to its place and its tongue engaging the grooves as it advances, and being thereby effectually prevented from turning back until the tongue is released.

The bolt A is of any ordinary form and has a longitudinal groove or grooves B cut across its threads $a$. These grooves may be as numerous as may be desired. The more numerous they are the more accurately may the nut be set up to its place. These grooves are generally V-shaped, their rearward sides, however, being sufficiently abrupt so that the end of the tongue or pawl will not rise thereupon.

The nut C is without distinctive features of any kind. It is shown as an ordinary square nut, but may have a greater number of sides.

The washer and lock D are formed of a piece of strop-steel having sufficient width so that it may be apertured, as at $d$, to receive the bolt A, and of sufficient length so that its ends may be turned up perpendicularly, so as to receive snugly between them the nut C. One end E of the washer D is of such length that it extends beyond the outer face of the nut and is cut partly across, so as to form a tongue or pawl $e$, which is curved inwardly, so as to cross the line of the periphery of the aperture $d$.

In assembling the parts the nut is fitted between the upstanding wings of the washer and both parts are applied to the end of the bolt. As the nut is turned up the washer rotates with it, the end of the pawl sliding upon the threads and falling into the grooves B as it reaches them. The nut is easily turned back, prying out the end of the pawl and holding it out of engagement with the grooves of the bolt.

This nut-lock is serviceable in any situation, but particularly in connection with machinery, such as reapers and mowers, which are subject to much jolting.

I claim as my invention—

1. In combination, a screw-bolt having a longitudinal groove in its threaded portion, a nut adapted to engage the bolt, and a washer having a pair of upturned ends for infolding the nut, one or both of such wings extending beyond the outer face of the nut and being provided with an inturned spring-tongue for engaging the groove in the bolt.

2. As a new article of manufacture, a washer having upturned, oppositely-disposed wings adapted to bear against a peripheral face of a nut, one or both of such wings having at their outer ends an inturned spring-tongue.

3. In combination, a screw-bolt having a longitudinal groove in its threaded portion, a nut adapted to engage the bolt, and a washer having an end upturned to bear against a peripheral face of the nut, and extending beyond the outer face of the same, and being provided with an inturned spring-tongue for engaging the groove in the bolt.

LEWIS J. BEHRER.

Witnesses:
LUDERN C. FRANKLIN,
EVAN EVANS.